United States Patent
Donze et al.

(10) Patent No.: US 9,531,597 B2
(45) Date of Patent: Dec. 27, 2016

(54) METHODS AND SYSTEMS TO MAINTAIN DATA COHERENCY

(75) Inventors: Fabian Donze, North Easton, MA (US); Debabrata Sengupta, Westford, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1595 days.

(21) Appl. No.: 12/914,659

(22) Filed: Oct. 28, 2010

(65) Prior Publication Data

US 2012/0109912 A1    May 3, 2012

(51) Int. Cl.
*H04L 12/24* (2006.01)

(52) U.S. Cl.
CPC .................... *H04L 41/12* (2013.01)

(58) Field of Classification Search
CPC ....................................... H04L 41/12
USPC ........................................ 707/694
See application file for complete search history.

(56) References Cited

U.S. PATENT DOCUMENTS

| | | | |
|---|---|---|---|
| 6,859,827 B2* | 2/2005 | Banginwar | 709/223 |
| 7,657,545 B2 | 2/2010 | Bird | |
| 7,701,900 B2 | 4/2010 | Barnum | |
| 8,264,903 B1* | 9/2012 | Lee et al. | 365/222 |
| 2004/0015504 A1* | 1/2004 | Ahad | G06F 17/3048 |
| 2005/0234945 A1* | 10/2005 | Folkert et al. | 707/100 |
| 2007/0014243 A1* | 1/2007 | Meyer et al. | 370/249 |
| 2008/0104256 A1* | 5/2008 | Olston | 709/228 |
| 2008/0127259 A1 | 5/2008 | Hong et al. | |
| 2008/0147616 A1* | 6/2008 | Larsson et al. | 707/3 |
| 2009/0073942 A1* | 3/2009 | Qin et al. | 370/338 |
| 2009/0254750 A1* | 10/2009 | Bono et al. | 713/170 |
| 2010/0046395 A1 | 2/2010 | Krishnan et al. | |
| 2011/0060881 A1* | 3/2011 | Gallagher | G06F 17/30902 711/133 |

FOREIGN PATENT DOCUMENTS

CN        101242306        8/2008

* cited by examiner

*Primary Examiner* — Jorge A Casanova

(74) *Attorney, Agent, or Firm* — Hewlett Packard Enterprise Development Patent Department

(57) ABSTRACT

In one embodiment, a data coherency system access an age criterion associated with a data set and determines a previous refresh time associated with the data set. The data coherency defines a next refresh time that satisfies the age criterion relative to the previous refresh time and schedules a request for the data set at the next refresh time.

20 Claims, 8 Drawing Sheets

METHODS AND SYSTEMS TO MAINTAIN DATA COHERENCY

BACKGROUND

Management entities within communications networks periodically request updated discoverable information from devices within those communications network because communications networks and the devices within communications networks typically change dynamically during operation. For example, communications networks and devices within communications networks change dynamically due to, for example, failure of devices or device components, addition or removal of devices or device components, reconfiguration or re-provisioning of the devices or communications networks, and/or other changes within the communications networks. Thus, discoverable information about those devices and communications networks is updated at management entities to improve coherency between the data sets representing the discoverable information at the devices and at the management entities.

Known management entities typically poll or request updated discoverable information from the devices based on a schedule that specifies the times at which the management entity should request updates. For example, a schedule can specify that updates be requested at a fixed time each day, each week, hourly, or at other times. Thus, the management entity requests updated information from the devices that have previously been discovered within the communications network.

Such known data update mechanisms or processes, however, frequently fail to adequately maintain data coherency. For example, due to maintenance, failures, and/or outages within a communications network, one or more devices can be unreachable when a management entity requests the updated information. As another example, if the management entity attempts to request updated information at a time of high network usage or congestion, the requests for updated information can be lost, ignored, or suffer from timeout conditions. More specifically, for example, periods of network congestion can be caused when a system administrator schedules a management entity to request updates for many data sets at a common time. That is, requests for updated information can be lost, ignored, or suffer from timeout conditions at times when a processing or network load at a management entity is high due to many requests scheduled at a common time rather than the requests being well-distributed during a period of time.

Due to such failures, some devices do not (or are unable to) provide updated information to the management entity and the data at the management entity becomes stale or loses coherency. Furthermore, although systems administrators typically can manually generate new requests for the updated discovery information or can manually alter the schedule to avoid network congestion or outages, such manual intervention is costly and tedious. Additionally, because management entities determine that a request for updated information failed only after a scheduled request fails, the discoverable information at the management entities becomes stale because the deadline for that data has already passed. As a result system administrators are often unable to efficiently manage updating discoverable information from devices within a communications network.

DETAILED DESCRIPTION

Figure 1:
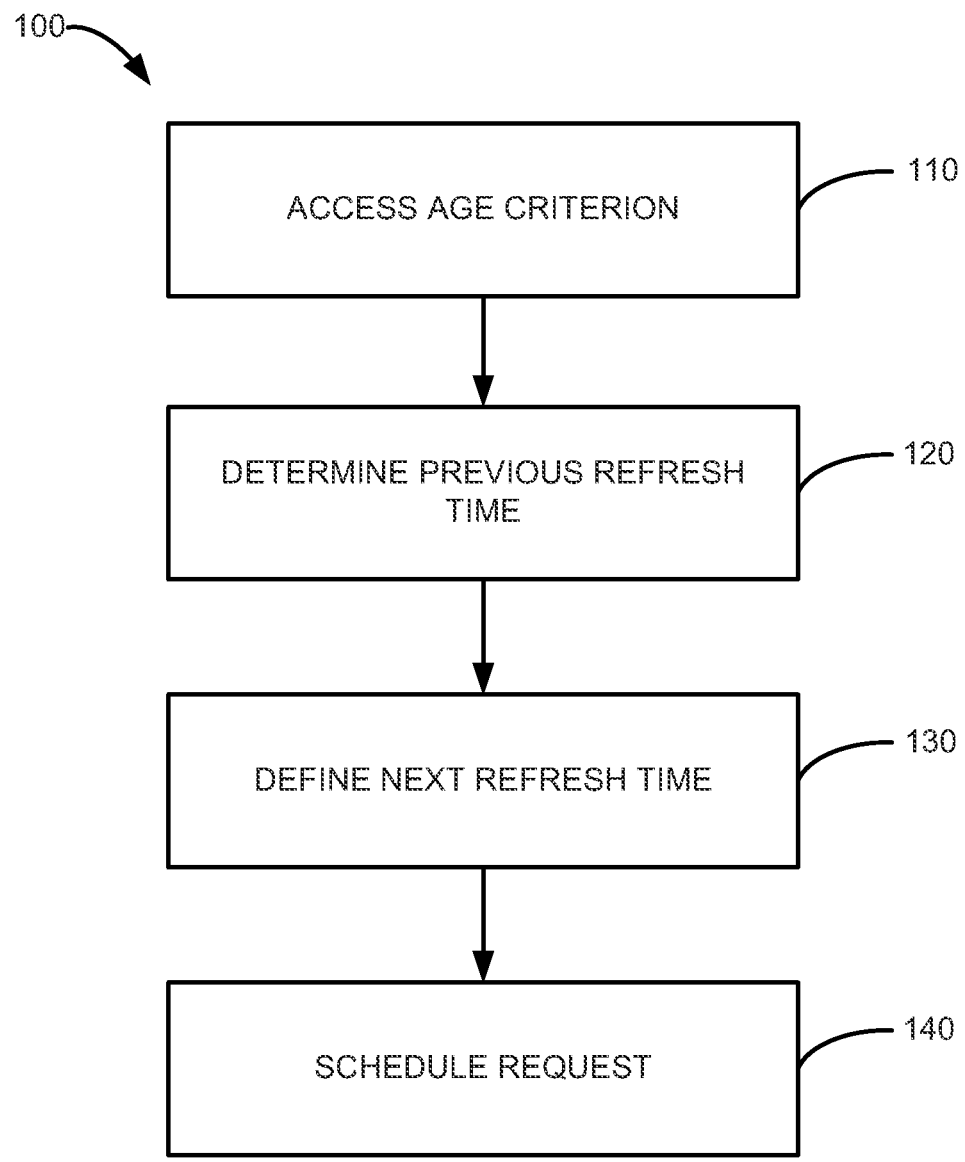
FIG. 1 is a flowchart of a process to schedule a data request based on an age criterion, according to an embodiment.

Management entities (e.g., hardware entities or modules or software entities or modules that are stored at a memory and executed at a processor or are hosted) monitor, manage, and/or provision communications networks and devices (e.g., computing devices such as personal computers, notebook or laptop computers, handheld computers, switches, routers, hubs, servers such as database or web service servers, or virtual machines hosted at computing devices) within communications networks based on discoverable information at those devices. More specifically, management entities typically perform device discovery processes and data (or information) discovery processes. During device discovery processes, management entities receive information related to the presence of a device within a communications network such as a host name, an Internet Protocol ("IP") address, or media access control ("MAC") address. For example, management entities can receive information that is broadcast by a new device to the communications network via a communications link of the communications network when the new device is first operatively coupled to the communications link. Alternatively, management entities can poll for new devices within in the communications network. That is, for example, a management entity can broadcast a request for information from new devices within a communications network via a communications link of the communications network and an operating system or an agent hosted at new devices can respond to the request.

After information related to the presence of a new device is received at the management entity, the management entity typically discovers (e.g., requests and receives) one or more data sets that include discoverable information of the new device. For example, devices within a communications network can include information related to attributes (i.e., components, capabilities, and/or characteristics) of those devices. More specifically, for example, a devices can include device identification data, data related to the components of the devices (e.g., which hard disk drives, software applications, network interfaces, or other components are installed at a device), data related to the capabilities of the devices (e.g., what properties or capabilities are provided by the components of a device), data related to the configuration of the devices (e.g., what operating systems are installed at the device and what mount points are available at the device), data related to interconnection (i.e., communications links) among the devices, and/or other information that can be used to monitor, manage, and/or provision the devices and/or communication network. Because communications networks typically change dynamically during operation due to, for example, failure of devices or device components, addition or removal of devices or device components, reconfiguration or re-provisioning of the devices or communications networks, and/or other changes within the communications networks, discoverable information is updated to improve coherency between the data sets representing the discoverable information at the devices and at the management entity. In other words, the discoverable information is updated at the management entity to keep the data sets storing the discoverable information at the management entity current with respect to the discoverable information at the devices.

To maintain data coherency between the discoverable information stored at a management entity and the discoverable information that is stored and updated at the devices within a communications network as the communications network and devices change, the management entity typically updates (e.g., polls or requests the updated) information from the devices based on a schedule that specifies the times at which the management entity should request updates. For example, a schedule can specify that updates be requested at a fixed time each day (e.g., at 3:00 AM every day), each week (e.g., at 1:00 AM each Monday), hourly (e.g., at 15 minutes past each hour), or at other times. Thus, the management entity requests updated information from the devices that have previously been discovered within the communications network.

Data update mechanisms or processes, however, frequently fail to adequately maintain data coherency. For example, due to maintenance, failures, and/or outages within the communications network, one or more devices can be unreachable when the management entity requests the updated information. As another example, if the management entity attempts to request updated information at a time of high network usage or congestion (e.g., when a data backup process is active within the communications network), the requests for updated information can be lost, ignored, or suffer from timeout conditions. Such failures can be particularly prevalent when the requests are issued using protocols that do not provide delivery assurances such as, for example, the User (or Universal) Datagram Protocol ("UDP"). As a result of such failures, some devices do not (or are unable to) provide updated information to the management entity and the data at the management entity becomes stale or loses coherency.

When these update mechanisms or processes fail, systems administrators typically can manually generate a new request for the updated information or can alter the schedule to avoid network congestion or outages. Additionally, some management entities can determine that a request for updated information failed and can automatically generate another request for updated information. Such recovery mechanisms and processes, however, can be time consuming for system administrators and often result, nevertheless, in stale data because the management entities do not determine whether the updated information has been received until after the scheduled or deadline time for an update.

Embodiments discussed herein schedule requests for updated information and update information based on age criteria associated with the data set rather than based on a fixed or periodic time schedule. In other words, age criteria such as a maximum age of a data set (e.g., time elapsed since that data set was last updated) can be defined within a data refresh policy associated with the data set and a data coherency engine can schedule requests for updated information (e.g., an updates of the data set) based on the age criteria. That is, the age criteria can specify how fresh or new the data sets representing the information should be. Such scheduling can be adaptive such that updated information is requested before the data set reaches the defined maximum age. If the data coherency engine determines that a request for updated information (or data sets representing that information) failed, the updated data set can be requested again before the data set representing (or including) that information reaches the defined maximum age (i.e., before that information no longer satisfies the age criteria).

Moreover, the data refresh policy can include periods that are defined as blackout periods during which, for example, a communications network will experience an outage or congestion. The data coherency engine can detect that a candidate time for a request for updated information and can reschedule that request for a time that is not included within the blackout period. Moreover, the data coherency engine can maintain a list of periods during which requests for updated information have failed. The data coherency engine can dynamically define blackout periods based on this list (or can updated the blackout periods defined within a data refresh policy) and can prevent requests for updated information from being generated during those blackout periods.

As a specific example, a data refresh policy can define an age criterion of two days for a data set. After a device is detected within a communications network and a data set is initially received from the device, a data coherency engine schedules a request for an updated data set at a next refresh time that is one and a half days from the initial (or previous) request time based on the age criterion of the data refresh policy. If the request at the next refresh time fails, the data coherency engine selects a candidate next refresh time that is three hours from the previous next request time. The data coherency engine detects that the candidate next refresh time is during a blackout period defined in the data refresh policy and schedules another request for the updated data set at a new next request time that is four hours from the previous next request time (a time that is not included in the blackout period). If the request fails at the new request time, the data coherency module schedules another request for the updated data set at a new next request time that is one hour from the previous next request time. This process can continue until the updated data set is received or the updated data set is not received within the age criterion. Thus, the data coherency engine can adaptively request an updated data set until the updated data set is received. Additionally, a system administrator can be notified (e.g., via electronic mail, instant messaging, a control panel such as a graphical user interface ("GUI") of a software application, or updates to a web page) of various failures such as each time a request for updated information fails or when the age criterion is not met or satisfied (i.e., the updated data set is not received before the data set at reaches the age criterion).

As used in this specification, the singular forms "a," "an," and "the" include plural referents unless the context clearly dictates otherwise. Thus, for example, the term "virtual migration tool" is intended to mean one or more virtual migration tools or a combination of virtual migration tools. Additionally, as used herein, the term "module" refers to circuitry and/or software, firmware, programming, machine- or processor-readable instructions, commands, or code that are stored at a memory and executed or interpreted at a processor.

FIG. 1 is a flowchart of a process to schedule a data request based on an age criterion, according to an embodiment. Process 100 can be implemented as a hardware module, as a software module hosted at a computing device, and/or as a combination of a hardware module and a software module. For example, process 100 can be implemented as application-specific circuitry or as a software module including instructions stored at a memory and executed at a processor in communication with the memory. More specifically, for example, process 100 can be implemented at a data coherency engine within a communications network.

An age criterion such as a maximum age of a data set or a minimum age of a data set is accessed at block 110. For example, a data coherency engine can access an age criterion at a data refresh policy stored at a data store such as a file system or database. A previous refresh time of, for example, a data set to which the age criterion applies is determined at block 120. For example, a data coherency engine can store a time value at which a data set was previously received or accessed from a device within a communications network. In other words, the previous refresh time is the time at which the data set was previously refreshed.

A next refresh time is defined at block 130 based on the age criterion and the previous refresh time. More specifically, for example, a next refresh time that is half of a maximum age of the data set (as defined by the age criterion) from the previous refresh time can be defined at block 130. Alternatively, the next refresh time can be more or less than half of a maximum age of the data set. For example, the next refresh time can be three-quarters of a maximum age of the data set from the previous refresh time. In other words, the next refresh time is dynamically defined based on an age criterion and a previous refresh time rather than by a static or fixed time schedule.

A request for the data set (or a data request) at the next refresh time is scheduled at block 140. That is, a request for the data will be issued or executed at the next refresh time based on the schedule. The request can be scheduled by, for example, adding an entry to a scheduling process or daemon such as a cron job within a Linux® environment. Alternatively, for example, a timer or other event can be set to expire at the next refresh time and the request can be executed at the expiry of that timer.

Process 100 can include blocks in addition to those illustrated in FIG. 1. Additionally, one or more blocks can be rearranged. For example, a second age criterion such as a minimum age of a data set can be accessed and the next refresh time can be greater than that minimum age from the previous refresh time. Furthermore, although process 100 is discussed above with reference to an example environment within a communications network, process 100 is applicable within other environments.

Figure 2:
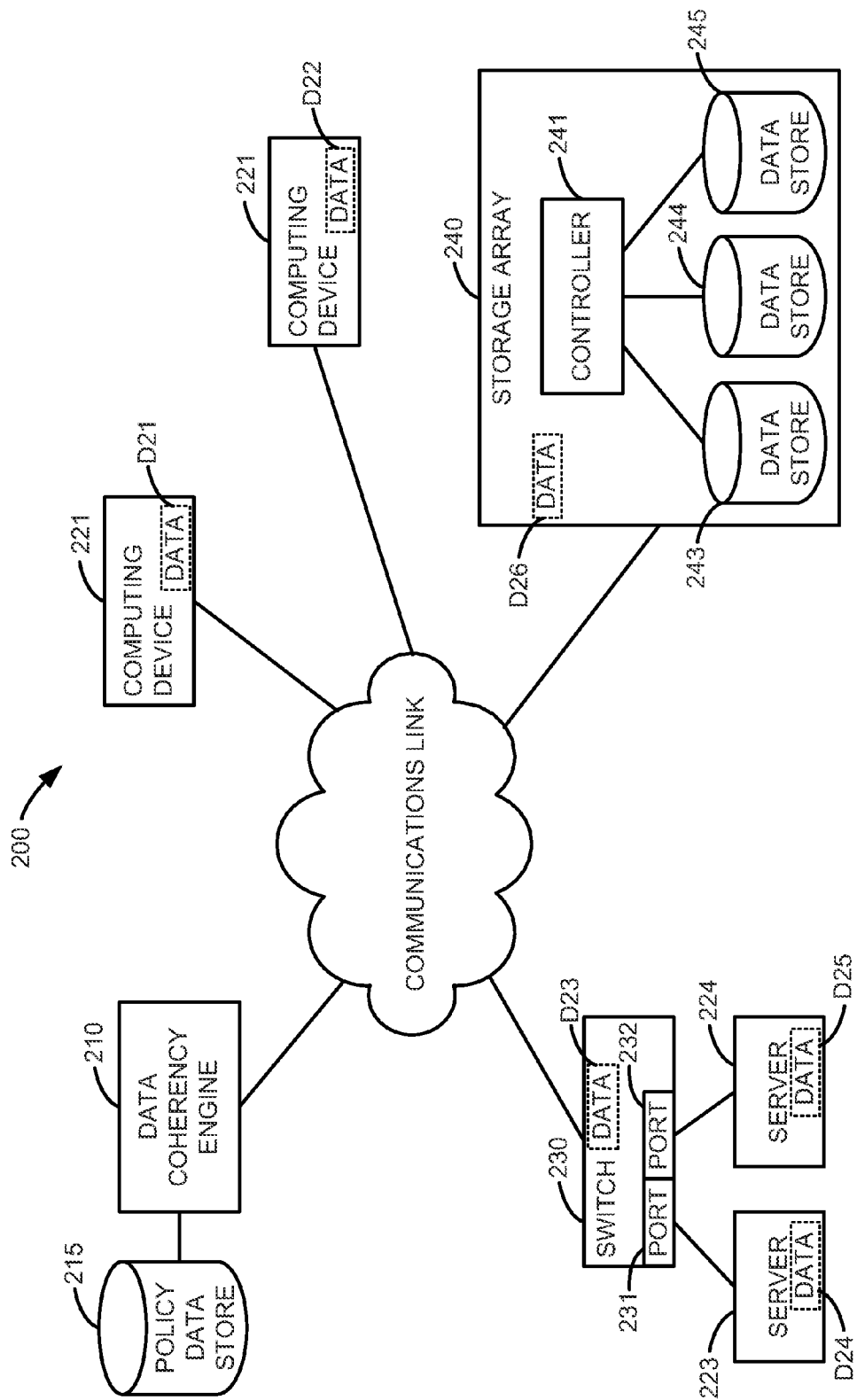
FIG. 2 is a schematic diagram of an environment including a data coherency engine, according to an environment.

FIG. 2 is a schematic diagram of an environment including a data coherency engine, according to an environment. Environment 200 can be described as a communications network such as a communications network within a data center. Environment 200 includes multiple elements such as data coherency engine 210, computing devices 221 and 222, switch 230, servers 223 and 224, and storage array 240. Computing devices 221 and 222 can be any of a variety of computing devices such as computer servers (or servers), personal computers, laptop or notebook computers, storage devices such as network attached storage ("NAS") devices, databases, and/or other computing devices. Similarly servers 223 and 224 are computing devices that host any of a variety of services such as database services, web services, storage resources, data processing services, and/or other services. In some embodiments, one or more computing devices 221 and 222 and servers 223 and 224 are virtualized. That is one or more of computing devices 221 and 222 and servers 223 and 224 can be implemented as virtual machines.

Figure 3:
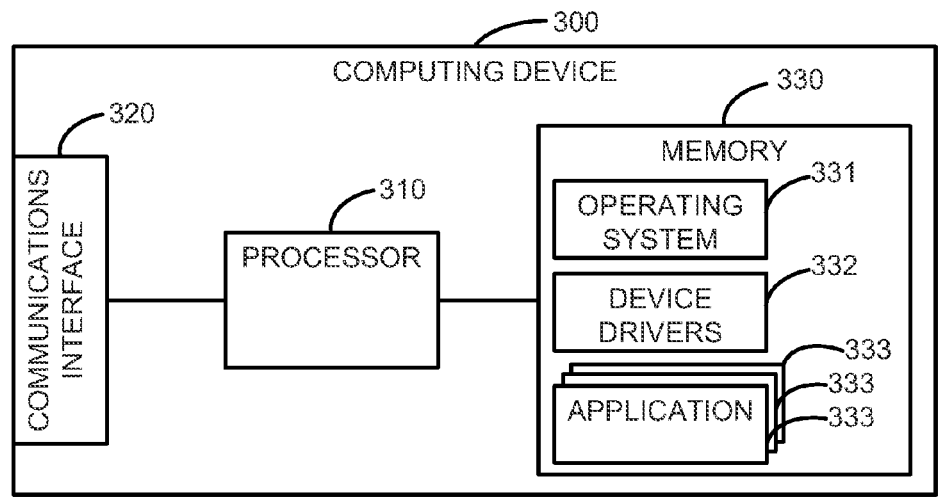
FIG. 3 is a schematic block diagram of a computing device, according to an embodiment.

As an example of a computing device, FIG. 3 is a schematic block diagram of a computing device, according to an embodiment. As illustrated in FIG. 3, computing device 300 includes communications interface 320, processor 310, and memory 330. Processor 310 is operatively coupled to communications interface 320 and memory 330. Typically, as illustrated in FIG. 3, memory 330 includes instructions or codes (e.g., computer codes or object codes) defining software modules that are executed by processor 310 during operation of computing device 310. For example, memory 330 includes instructions that define operating system 331, device drivers 332, and applications 333 (e.g., software application programs). In other words, operating system 331, device drivers 332, applications 333, and other software modules stored as instructions (not shown) at memory 330 and executed at processor 310 are hosted at computing device 300. Applications 333 can include, for example, an application module, a hypervisor, a web server or service, a database interface, and/or an environment such as a runtime environment and/or virtual machine.

Memory 330 can include volatile memory such as static random access memory ("SRAM") and/or dynamic random access memory ("DRAM") and nonvolatile memory such as magnetic media (e.g., a hard disk drive), optical media (e.g., a compact disc ("CD") and/or a digital video disc ("DVD")), solid-state media (e.g., a USB FLASH memory device), and/or other processor-readable media. For example, nonvolatile memory can be used as long-term storage for operating system 331, device drivers 332, applications 333, data files (not shown), and/or other software modules stored as instructions (not shown), and operating system 331, device drivers 332, applications 333, data files (not shown), and/or other software modules stored as instructions (not shown) can be loaded into volatile memory for execution at processor 310.

Communications interface 320 is an interface accessible to processor 310 to communicate with (i.e., transmit symbols representing data to and receive such symbols from) other processors and/or computing devices via a communications link. In other words, communications interface 320 can receive data from processor 310 and transmit symbols representing that data via a communications link. Moreover, communications interface 320 can receive symbols from other communications interfaces via a communications link and send data represented by those symbols to processor 310. For example, communications interface 320 can be a telephone network interface, a twisted-pair network interface, a coaxial network interface, a fiber-optic network interface, a wireless network interface such as a wireless local area network ("WLAN") or a cellular network, and/or some other network or communications interface.

Referring to FIG. 2, switch 230 is a communications device or network device that provides access to communications link 180 to computing devices such as servers 223 and 224. As illustrated in FIG. 2, switch 230 includes ports 231 and 232 via which servers 223 and 224, respectively, are coupled to switch 230. In some embodiments, switch 230 can be another network device such as a router, a gateway, a bridge, a hub, and/or some other network device. Moreover, environment 200 can include multiple switches, routers, gateways, bridges, hubs, and/or other network devices.

Storage array 240 is a device or group of devices that provides a data storage service within environment 200. For example, data stores 243, 244, and 245 can be data stores such as hard disk drives, solid-state drives, and/or other data storage services that are each accessible within environment 200 (e.g., to store and/or access data stored at data stores 243, 244, or 245). Controller 241 can be a hardware module, a software module hosted at a computing device, and/or a combination thereof that manages storage of data at data stores 243, 244, and 245 and defines an interface via which other computing devices can access and/or store data at data stores 243, 244, and 245 via communications link 280. For example, controller 241 can provide redundant storage of data at data stores 243, 244, and 245 or can stripe or multiplex/demultiplex data to and from data stores 243, 244, and 245. As a specific example, controller 241 can include a redundant array of independent/inexpensive disks ("RAID") controller, a redundant/reliable array of independent/inexpensive nodes ("RAIN") controller, or a just a bunch of disks ("JBOD") controller.

Communications link 280 can include any connector and/or system that allows data coherency engine 210, computing devices 221 and 222, switch 230, server 223 and 224, and/or storage array 240 to communicate one with another and/or with other computing devices. For example, communications link 280 can be one or more of a cable (e.g., telecommunication cable, twisted-pair cable, coaxial cable, or fiber-optic cable), wireless link or connection (e.g., radio-frequency link, wireless optical link, infrared link, or sonic link), or any other connector or system that supports transmission of communications symbols. Additionally, communications link 280 can include a communications network or combination of communications networks capable of transmitting information (e.g., symbols or signals representing data) such as, for example, an Ethernet network, a fiber-optic network, a switch fabric, a wireless network, an intranet, and/or the Internet.

In some embodiments, communications link 280 can include multiple communications links and/or communications networks operatively coupled one to another by, for example, bridges, routers, switches, hubs, and/or gateways. For example, computing device 222 can be operatively coupled to a cellular network (not shown) and data coherency engine 210 can be operatively coupled to a fiber-optic network (not shown). The cellular network and fiber-optic network can each be operatively coupled one to another via one or more network bridges, routers, switches, and/or gateways such that the cellular network and the fiber-optic network are operatively coupled to form a communications link. Alternatively, the cellular network and fiber-optic network can each be operatively coupled one to another via one or more additional communications networks. For example, the cellular network and the fiber-optic network can each be operatively coupled to the Internet such that the cellular network, the fiber-optic network and the Internet are operatively coupled to form a communications link.

Data coherency engine 210 is a hardware module, a software module hosted at a computing device, or a combination of a hardware module and a software module that schedules requests for data sets from elements of environment 200. For example, data coherency engine 210 can access data refresh policies at data store 215 and schedule requests for data sets associated with those data refresh policies based on age criteria included within those data refresh policies. In some embodiments, data coherency engine 210 requests and receives the data sets.

Figure 4:
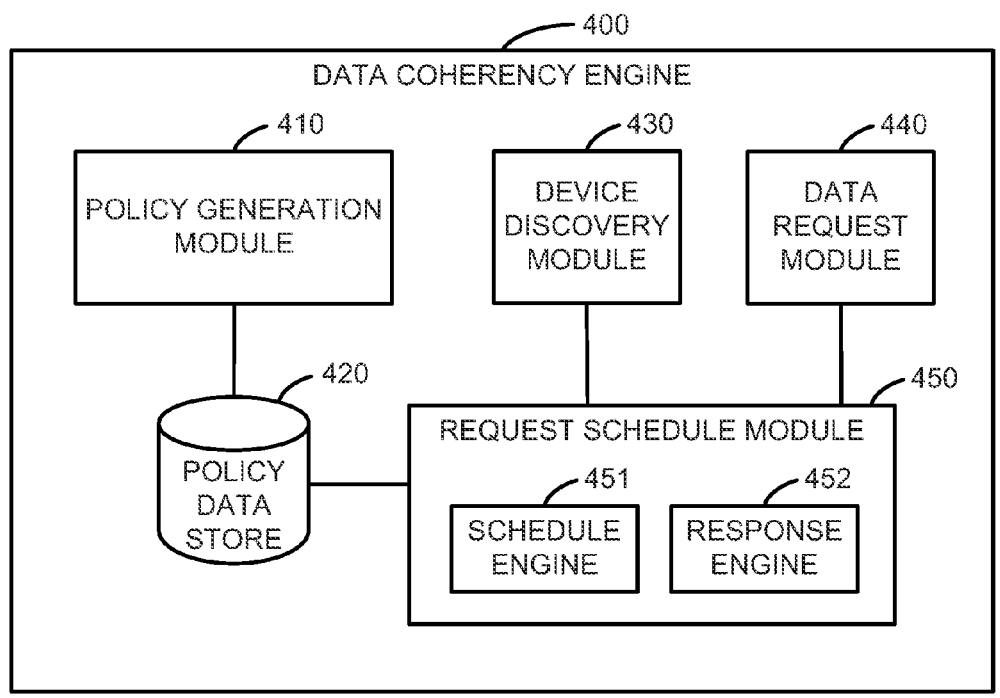
FIG. 4 is a schematic block diagram of a data coherency engine, according to an embodiment.

As an example, FIG. 4 is a schematic block diagram of a data coherency engine, according to an embodiment. Data coherency engine 400 includes policy generation module 410, policy data store 420, device discovery module 430, data request module 440, and request schedule module 450.

As discussed above, data coherency engine 400 can be a hardware module, a software module hosted at a computing device, or a combination of a hardware module and a software module. Thus, policy generation module 410, policy data store 420, device discovery module 430, data request module 440, and request schedule module 450 can each be a hardware module, a software module hosted at a computing device, or a combination of a hardware module and a software module.

Policy generation module 410 defines an interface via which a user of data coherency engine 400 such as a system administrator can define a data refresh policy. For example, policy generation module 410 can generate web pages accessible via a web browser that include text fields, lists of values, check boxes, radio boxes, and/or other controls the user can manipulate to define parameters of a data refresh policy such as identifiers of data sets to which the data refresh policy applies, age criteria, and/or blackout periods. Alternatively, policy generation module 410 can define a graphical user interface other than a web page via which a user can manipulate controls to define parameters of a data refresh policy. As yet another alternative, policy generation module 410 can define a command line interface via which a user can enter commands, values, and/or instructions to define parameters of a data refresh policy.

Figure 5:
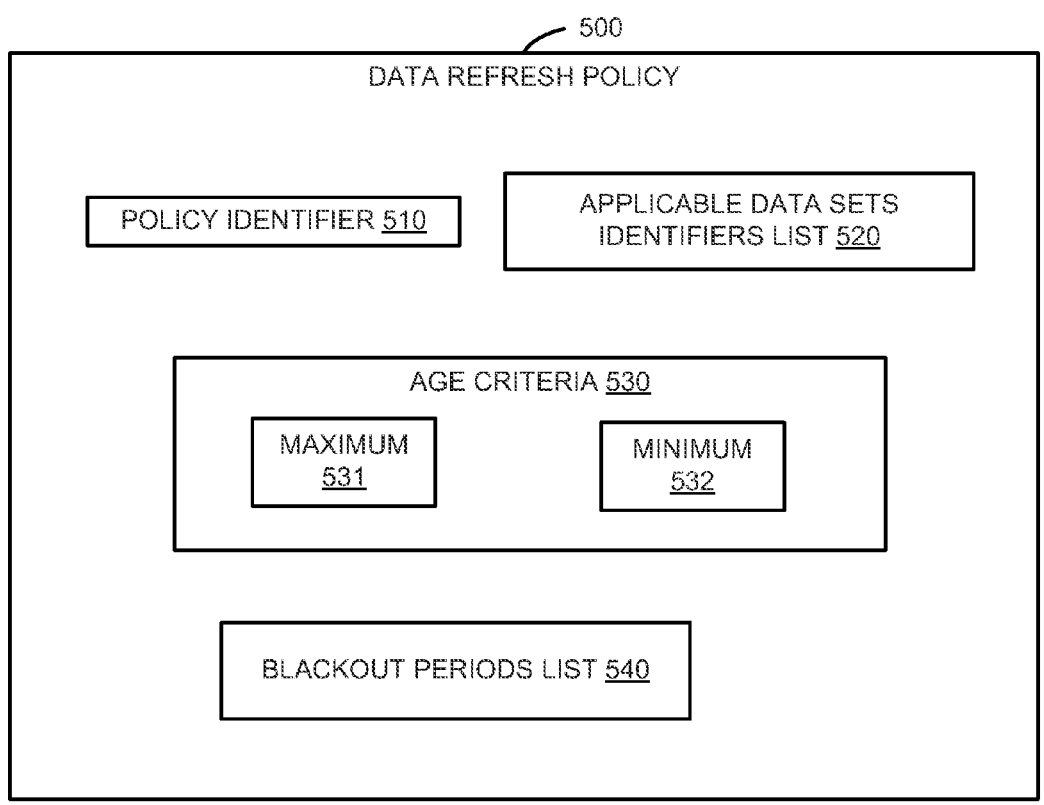
FIG. 5 is an illustration of a data refresh policy, according to an embodiment.

FIG. 5 is an illustration of a data refresh policy, according to an embodiment. Data refresh policy 500 includes policy identifier 510, applicable data sets identifiers list 520, age criteria 530, and blackout periods list 540. Data refresh policy 500 can be stored at one or more tables within a database and/or as a file within a file system of a data store. For example, data refresh policy 500 can be stored as a flat text file or as a hierarchical file (e.g., an extensible markup language ("XML") document) within a file system.

Policy identifier 510 is a name, numeric identifier, and/or other value that identifies data refresh policy 500 from other data refresh policies. Applicable data sets identifiers list 520 includes a group of identifiers of data sets to which data refresh policy 500 applies. For example, applicable data sets identifiers list 520 can include one or more device type or model identifiers; one or more device characteristic identifiers such as an operating system identifier, a spindle speed or interface type of a hard disk drive, a communications interface identifier (e.g., a MAC address, an IP address, or a port at a switch or router), a range of communications interface identifiers, or some other identifier of a characteristic of a device; an identifier or a group of devices or data set grouped based on (or defined by), for example, a common device model, component, or compatibility; and/or one or more device capability identifiers such as an identifier or a service or software application hosted at a device. The identifiers in applicable data sets identifiers list 520 are interpreted by a data coherency engine to determine whether data refresh policy 500 applies to a data set. For example, if a data set is related to a device, a device characteristic, or device capability that has an identifier included in applicable data sets identifiers list 520, the data coherency engine can apply data refresh policy 500 to that data set. In other words, the data coherency engine can schedule requests for that data set based on parameters of data refresh policy 500 (e.g., age criteria 530 and/or blackout periods list 540).

Age criteria 530 is a value or group of values that defines or describes how often a data set to which data refresh policy applies should be refreshed (or updated). That is, age criteria 530 define how often a data set should be updated to avoid becoming stale within a system. Thus, age criteria 530 can vary based on the system (e.g., environment), type of information represented by the data set, and/or the device, component, or capability to which data refresh policy 500 is related. As illustrated in FIG. 5, age criteria 530 include maximum value 531 and minimum value 532. Maximum value 531 represents a maximum age of a data set (e.g., time elapsed from a previous updated of the data set) before the data set should be updated. Minimum value 532 represents a minimum age of a data set (e.g., time elapsed from a previous updated of the data set) before which the data set should not be updated. Thus, age criteria 530 can define a range (or period) of time during which the data set should be refreshed. Alternatively, for example, age criteria 530 can include a single age criterion that defines a minimum age or maximum age of a data set.

Blackouts periods list 540 includes values that define periods of time during which an update for a data set to which data refresh policy 500 applies should not be requested. That is, blackout periods list 540 includes one or more periods of time (e.g., hours during a day, hours during a specific day of the week, or days) during which a data coherency engine interpreting (or executing) data refresh policy 500 should not schedule requests for updates to a data set to which data refresh policy 500 applies. In some embodiments, blackout periods list 540 can include an identifier of or a reference to (e.g., a uniform resource identifier ("URI")) a service that lists blackout periods. For example, blackout periods list 540 can include a URI of a web service that is updated dynamically to include blackout periods such as periods when a communications link will be subject to maintenance, congestion, or other conditions that can result in failed requests for updated data sets. A data coherency engine interpreting (or executing) data refresh policy 500 can access the web service using the URI and reschedule requests for updated data sets to which data refresh policy 500 applies if those requests are included within any listed blackout period.

In some embodiments, data refresh policy 500 can include additional parameters that define or describe how or when updated data sets should be requested. For example, data refresh policy 500 can include one or more parameters that define how often or after which periods of time a failed request for updated data sets is repeated (or retried). More specifically, for example, data refresh policy 500 can include a parameter that specifies an exponentially decreasing time between requests for an updated data set until that updated data set is received. That is, an age criterion can specify that a data set should be updated every 48 hours. The first request can be scheduled for 36 hours after the data set was last (or previously) updated. If the first request fails, a second request can be scheduled for 42 hours after the data set was last updated. If the second request fails, a third request can be scheduled for 44 hours after the data set was last updated. This process can continue until the requests are sent at a maximum rate defined within data refresh policy 500.

Referring to FIG. 4, policy data store 420 is a data store such as a hard disk drive, a solid-state drive, a database, or a data storage service. In some embodiments, as illustrated in FIG. 2, policy data store can be external to data coherency engine 430. Policy data store 420 stores data refresh policies and is accessible to policy generation module 410 and request schedule module 450. Thus, policy generation module 410 can store data refresh policies at policy data store 420 after they are generated and request schedule module 450 can access data refresh policies at policy data store 420 to schedule requests for updated data sets based on the data refresh policies at policy data store 420.

Device discovery module 430 receives notifications related to new devices within, for example, a communications network. That is, device discovery module 430 receives information related to devices that are added to a communications network and provides this information to request schedule module 450. In some embodiments, device discovery module 430 interprets information sent via a communications link by devices that are added (e.g., coupled to) the communications network. In some embodiments, device discovery module 430 polls devices via a communications link to determine when new devices are added the communications network. In yet other embodiments, device discovery module 430 receives identifiers of devices and/or components and/or capabilities of those devices that are added to a communications network. For example, a management entity can detect when new devices are added to a communications network and provide information related to the new devices (e.g., devices identifiers, component identifiers, and/or capability identifiers of the new devices). This information can be provided to request schedule module 450 and request schedule module 450 can use this information to schedule a request for updated data sets (i.e., updated information represented by data sets) from those devices.

Data request module 440 requests updated data sets via a communications link in response to signals or commands from request schedule module 450. That is, request schedule module 450 can cause data request module 440 to send requests for updates of data sets. Data request module 440 can be, for example, a network protocol stack or other software module hosted at a computing device that interacts with a communications network. In some embodiments, data request module 440 also receives responses with the requested data sets from, for example, devices within a communications network and provides the requested data sets to request schedule module 450. Moreover, in some embodiments, data request module 440 detects when requests for updated data sets have failed. For example, if a response to a request for an updated data set is not received within a predetermined amount of time (e.g., a timeout period defined within a data refresh policy), if a communications connection or session is terminated, or if a communications error is detected, data request module 440 can provide a signal to request schedule module 450 indicating that a request for an updated data set failed.

Request schedule module 450 receives information related to devices and data sets (e.g., which components or capabilities a devices includes and when at data set was last updated) and dynamically generates a schedule of requests for updated data sets based on the information related to the devices, the data sets, and data refresh policies stored at policy data store 420. For example, as illustrated in FIG. 4 request schedule module 450 includes schedule engine 451 to generate a schedule of requests for updated data sets. Schedule engine 451 is a hardware module, a software module hosted at a computing device, or a combination thereof.

Additionally, request schedule module 450 can determine that a data set was received or was not received (e.g., within a period of time) at data coherency engine 400 in response to a request for an updated data set. As an example, request schedule module 450 includes response engine 452 to determine that a data set was received in response to a request for an updated data set. Response engine 452 is a hardware module, a software module hosted at a computing device, or a combination thereof. As a specific example, response engine 452 can include a timer and can determine that a data set was not received at the expiry of the timer or when the timer reaches a particular value. In other words, request schedule module 450 schedules requests for updated data sets based on data refresh policies and information related to data sets and can determine whether a data set was received in response to such a request for an updated data set. Scheduling of requests for updated data set is discussed in additional detail herein in relation to, for example, FIGS. 1, 6, 7, and 8. Additionally, request schedule module 450 can provide updated data sets to other elements or components of a management entity.

Referring to FIG. 2, data coherency engine 210 can schedule requests from data sets D21, D22, D23, D24, D25, and D26 stored at computing devices 221 and 222, switch 230, servers 223 and 224, and storage array 240, respectively. For example, data sets D21, D22, D23, D24, D25, and D26 can include discoverable information related to computing devices 221 and 222, switch 230, servers 223 and 224, and storage array 240, respectively, and or components or capabilities of these elements of environment 200. These data sets can be requested by data coherency engine according to a schedule defined at data coherence engine 210.

As examples of discoverable information stored at data sets, data set D21 and D22 can include information related to a device type or class, a device identity, an operating system, data stores such as internal or external hard disk drives and solid-state drives, mount points of data stores within an operating system, file systems of data stores, a memory, and/or other capabilities or components of computing devices 221 and/or 222. Similarly, data sets D24 and D25 can include information related to a service type or class, a device identity, an operating system, data stores such as internal or external hard disk drives and solid-state drives, mount points of data stores within an operating system, file systems of data stores, a memory, software applications, and/or other capabilities or components of servers 223 and/or 224. Furthermore, data sets D24 and D25 can include information related to communications or network interfaces such as an identifier of switch 230 and/or ports 231 and 232, respectively, to which servers 223 and 224 are coupled. Data set D23 can include information related to computing devices such as servers 223 and 224 coupled to switch 230 via ports 231 and 232, respectively, virtual local area networks ("VLANs") recognized by switch 230, security domains of switch 230, a number of ports of switch 230, a firewall configuration such as firewall rules of switch 230, and/or other information related to switch 230. Data set D26 includes information related to storage array 240 such as a configuration (e.g., RAID, RAID level or levels, RAIN, or JBOD) of controller 241 and data stores 243, 244, and 245, capabilities of storage array 240 such as data transfer rates, spindle speeds, or a capacity (e.g., total capacity, used capacity, and/or available capacity) of data stores 243, 244, and 245, and/or other information related to storage array 240, controller 241, and/or data stores 243, 244, and 245.

Data coherency engine 210 can request data sets D21, D22, D23, D24, D25, and D26 from computing devices 221 and 222, switch 230, servers 223 and 224, and storage array 240, respectively, by, for example, sending unicast or direct requests to these elements of environment 200 via communications link 200. Alternatively, for example, data coherency can request data sets D21, D22, D23, D24, D25, and D26 from computing devices 221 and 222, switch 230, servers 223 and 224, and storage array 240, respectively, by sending multicast or broadcast requests that identify which data sets are requested to multiple elements of environment 200 via communications link 200. Computing devices 221 and 222, switch 230, servers 223 and 224, and storage array 240 can each include, for example, an agent that receives these requests, accesses the requested data sets, and responds to those requests by sending the requested data sets to data coherency engine 210 via communications link 280. In some embodiments, the requests and/or responses can be encoded or encrypted to prevent disclosure of configuration or other information related to computing devices 221 and 222, switch 230, servers 223 and 224, and/or storage array 240.

Figure 6:
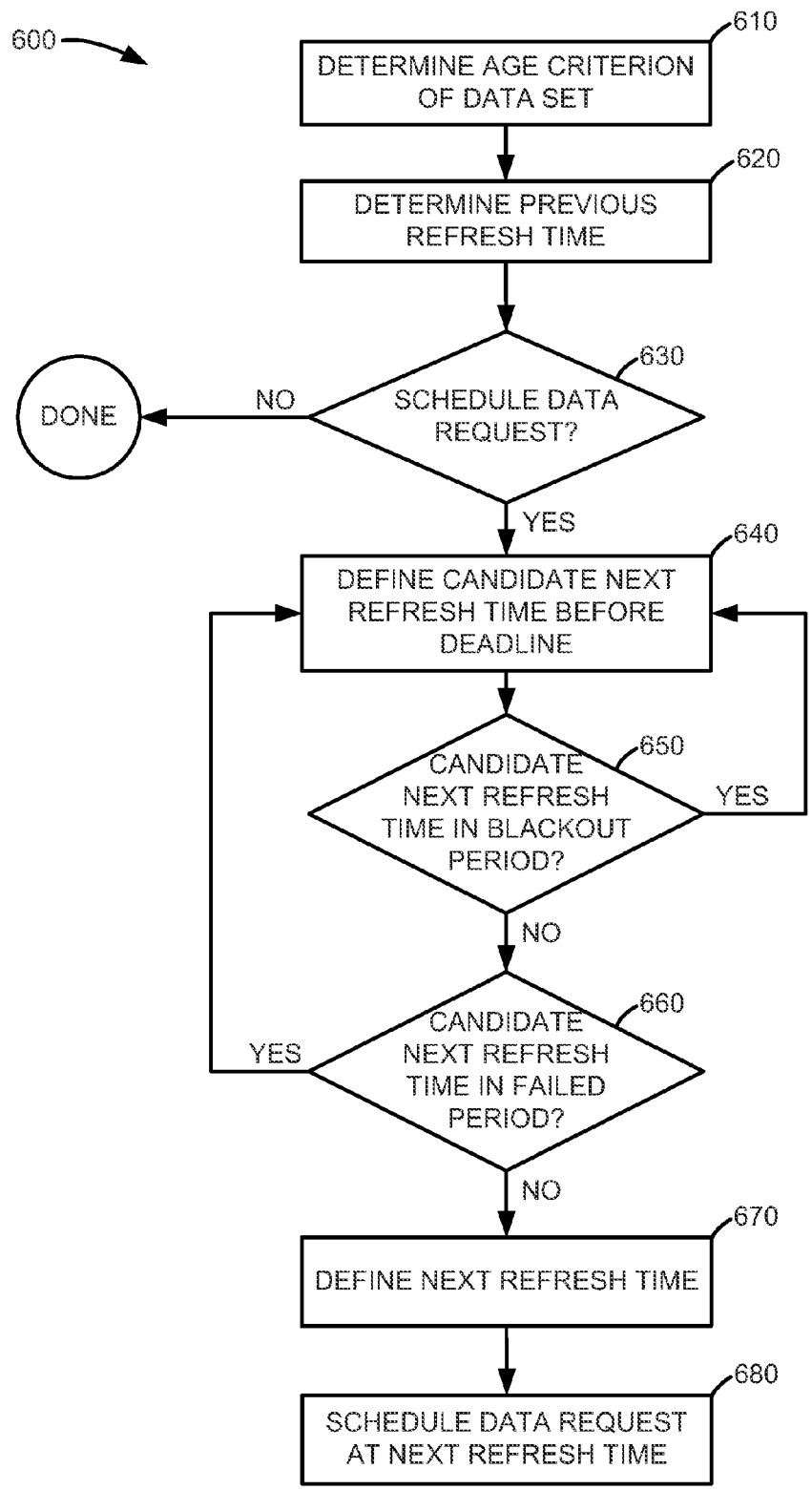
FIG. 6 is a flowchart of a process to schedule a data request, according to an embodiment.

FIG. 6 is a flowchart of a process to schedule a data request, according to an embodiment. Process 600 can be implemented as a hardware module, as a software module hosted at a computing device, and/or as a combination of a hardware module and a software module. For example, process 600 can be implemented as application-specific circuitry or as a software module including instructions stored at a memory and executed at a processor in communication with the memory. More specifically, for example, process 600 can be implemented at a data coherency engine within a communications network and executed, for example, when a new device is detected within the communications network or when an update of a data set is received.

An age criterion of a data set is determined at block 610. For example, a data set identifier such as an identifier of a device or a group (e.g., a group based on device, a group based on component, or a group based on one or more capabilities) with which the data set is associated (e.g., a device about which the data set includes information) can be compared with a list of data sets identifier within each data refresh policy from a group of data refresh policies. An age criterion (or multiple age criteria) from each data refresh policy that includes an identifier that matches the identifier of the device (or other identifier of the data set) is selected as an age criterion of the data set. In other words, multiple age criteria can be determined at block 610.

A previous refresh time of the data set is determined at block 620. For example, a data coherency engine can store a time value at a table indexed by an identifier of a data set when the data set is updated (i.e., an updated data set is received). This time value can be used as a previous refresh time at block 620. If there is no stored previous refresh time, a data coherency engine can set the current time as the previous refresh time. Alternatively, if there is no stored previous refresh time, a data coherency engine can set a time that is more than the greatest age criterion from the current time as the previous refresh time to force a request for an updated data set to be scheduled. Alternatively, time values representing previous refresh times can be stored external to a data coherency engine at, for example, a database. An identifier of the data set can be a key to the database such that when the data coherency module provides the identifier of the data set to the database, the database returns the corresponding previous refresh time, if any, from the database.

If the age criterion and the previous refresh time indicate that a request for an update to the data set should be scheduled at block 630, process 600 continues to block 640. If the age criterion and the previous refresh time indicate that a request for an update to the data set need not be currently scheduled at block 630, process 600 can terminate. A request for an update to the data set should be scheduled, for example, if the data set has an age than is more than a minimum age criterion. Similarly, for example, an update to the data set should not be scheduled if the data set has an age that is less than a minimum age criterion. In some embodiments, if a request for an update to the data set is already scheduled, process 600 terminates at block 630. Alternatively, for example, if a request for an update to the data set is already scheduled and the age criterion and the previous refresh time indicate that an update to the data set should be requested before the scheduled request, the scheduled request can be discarded (or unscheduled) and process 600 can continue to block 640.

A candidate next refresh time (i.e., a value representing a time) is defined (or generated) at block 640. The candidate next refresh time is at a time that is before a deadline defined by the previous refresh time and, for example, a maximum age criterion of the data set. In other words, the deadline is the time at which the age of the data set no longer satisfies the age criterion (or any or all of the age criteria) determined at block 610. Thus, an update to the data set should be requested before the deadline time.

The candidate next refresh time is typically defined to be a time that is sufficiently prior to the deadline time to allow for subsequent requests for an update to the data set if a request for an update to the data set at the candidate next refresh time fails. As an example, the candidate next refresh time can be at a time that is 75% of a time period defined by the previous refresh time and the age criterion from the previous refresh time. For example, if the age criterion is two days (i.e., the deadline time is two days or 48 hours from the previous refresh time), the candidate next refresh time can be set to be one and a half days from the previous refresh time. If the request for an update to the data set at the candidate next refresh time fails, additional (or subsequent) requests for an update to the data set can be requested during the remaining 12 hours (or half of a day) before the deadline time. In some embodiment, such additional requests are scheduled with exponentially increasing frequency. Alternatively, for example, such additional requests are scheduled with linearly increasing frequency.

The candidate next refresh time is then compared with blackout periods at block 650 and/or periods during which previous requests for updates to data sets or the particular data set for which the age criterion was selected at block 610 failed at block 660. For example, if the candidate next refresh time is included within a blackout period defined in a data refresh policy which applies to the data set or if the candidate next refresh time is included within a failed period (e.g., a period that is centered around the time at which a previous request for an update to a data set failed) stored at, for example, a data coherency engine, process 600 returns to block 640 and a new candidate next refresh time is defined.

If the candidate next refresh time is not within a blackout period or a failed period, process 600 continues to block 670 and the candidate next refresh time is defined as the next refresh time. A data request (e.g., a request for an updated data set) at the next refresh time is scheduled at block 680. In other words, the data request is scheduled such that it occurs (or is executed) at the next refresh time.

Process 600 can include blocks in addition to those illustrated in FIG. 6. Additionally, one or more blocks can be rearranged. For example, block 620 can be executed before block 610. Moreover, process 600 can include a block to select or access one or more data refresh policies that apply to a data set based on a data set identifier before blocks 610 and 620. Furthermore, although process 600 is discussed above with reference to an example environment within a communications network, process 600 is applicable within other environments.

Figure 7:
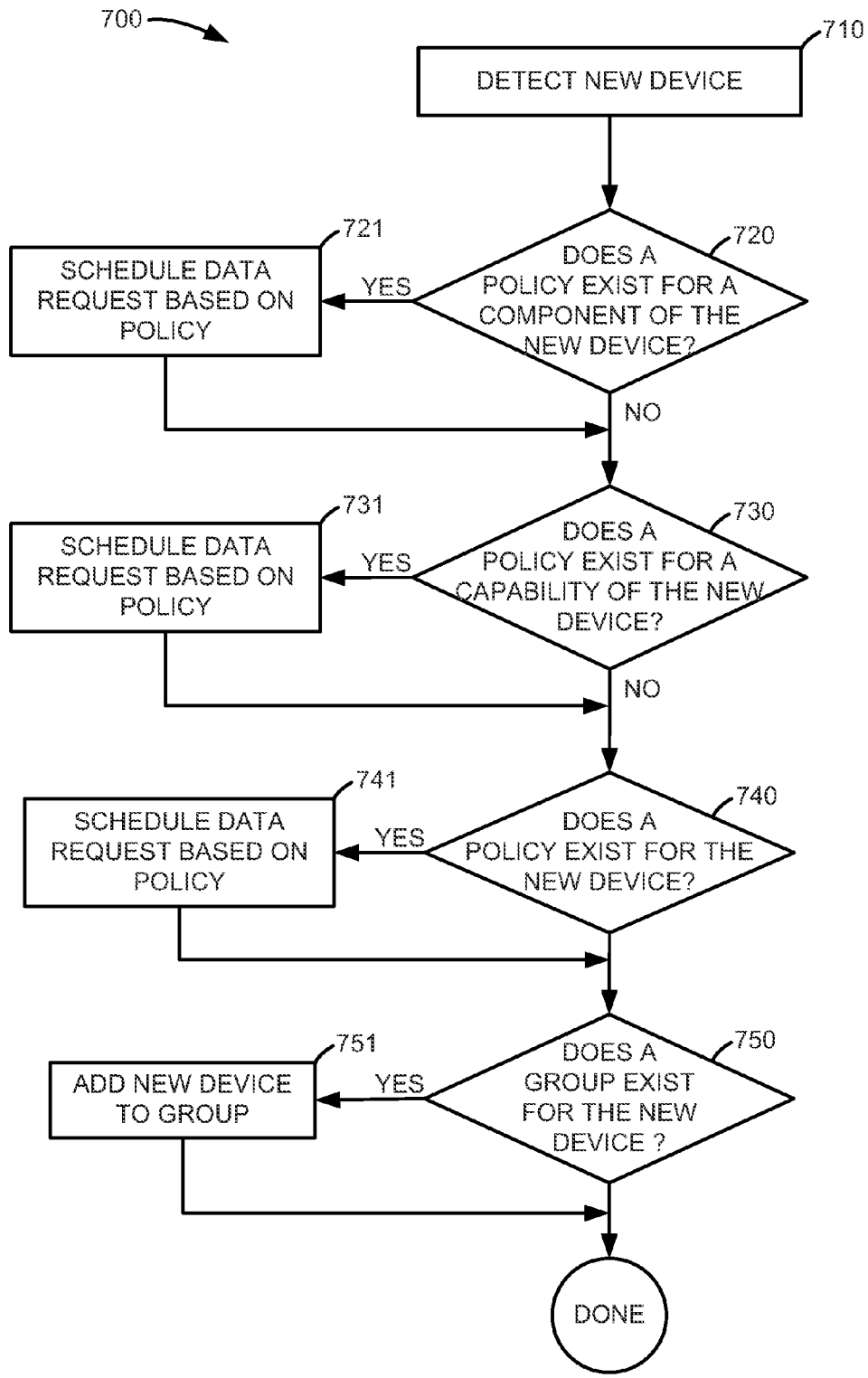
FIG. 7 is a flowchart of a process to select a data refresh policy, according to another embodiment.

FIG. 7 is a flowchart of a process to select a data refresh policy, according to another embodiment. Process 700 can be implemented as a hardware module, as a software module hosted at a computing device, and/or as a combination of a hardware module and a software module. For example, process 700 can be implemented as application-specific circuitry or as a software module including instructions stored at a memory and executed at a processor in communication with the memory. More specifically, for example, process 700 can be implemented at a data coherency engine within a communications network.

A new device is detected at block 710 and information related to the device such as information about the components and capabilities of the device are received, for example, at a data coherency engine. The data coherency engine can include data refresh policies that are related to groups of device (e.g., types, classes, models, etc. of devices), groups of components, groups of capabilities, and/or individual devices. In other words, data refresh policies can have various granularities. For example, a data refresh policy can apply to a single device, to a group of devices that are of a particular device class, to a component group (i.e., to any device that includes a particular component or to data sets related to that device component), and/or to a capability group (i.e., to any device that includes a particular capability or to data sets related to that device capability). Identifiers of the groups to which a data refresh policy applies can be stored at a list of identifiers of data set within that data refresh policy. In other words, a group identifier can be an identifier of a data set to which a data refresh policy applies. Said differently, a data set identifier within a data refresh policy can be a group identifier. A data coherency module can maintain a map or list of group identifiers and the devices that include data sets that belong to (or are included within) the groups identified by those group identifiers.

After a new device is detected at block 710, process 700 continues to block 720 to determine whether a data refresh policy exists for one or more components of the new device. For example, a list of data set identifiers (or device component identifiers) at each data refresh policy in a group of data refresh policies can be compared with identifiers of the components of the device. If an identifier of a component (or data set related to that component) matches an identifier within a list of data set identifiers, a data coherency engine can determine that the data refresh policy including that list of data set identifiers applies to the corresponding component of the new device and schedule (e.g., as discussed in relation to FIG. 6) a request for an update of a data set from the new device at block 721.

Process 700 then continues to block 730 to determine whether a data refresh policy exists for one or more capabilities of the new device. In other words, a list of data set identifiers (or device capability identifiers) at each data refresh policy in a group of data refresh policies can be compared with identifiers of the capabilities of the device. If an identifier of a capability (or data set related to that capability) matches an identifier within a list of data set identifiers, a data coherency engine can determine that the data refresh policy including that list of data set identifiers applies to the corresponding capability of the new device and schedule (e.g., as discussed in relation to FIG. 6) a request for an update of a data set from the new device at block 731.

Process 700 then continues to block 740 to determine whether a data refresh policy exists for the new device. In other words, a list of data set identifiers (or device identifiers) at each data refresh policy in a group of data refresh policies can be compared with an identifier of the device. If the identifier of the device (or data set) matches an identifier within a list of data set identifiers, a data coherency engine can determine that the data refresh policy including that list of data set identifiers applies to the new device and schedule (e.g., as discussed in relation to FIG. 6) a request for an update of a data set from that device at block 741.

A data coherency engine can then determine whether a group exists for the new device at block 750. For example, the data coherency engine can access a list of group specifications, each of which defines a group identifier and parameters of data sets that belong to that group. For example, a parameter of a data set can be a device model and data sets related to devices of that device model belong to the group described by a group specification including that parameter. As another example, a parameter can be an identifier of a component such as a software application or a capability such as a transfer speed of a data store (e.g., a hard disk drive or solid-state drive). If the device detected at block 710 includes information indicating that the device includes the capability or component, the device or data sets accessible (i.e., discoverable information) at the device related to the capability or component can be added to the group described by a group specification including that parameter.

If a group for the new device exists at block 750, the new device is added to the group at block 751. For example, an identifier of the device (or an identifier related to a data set) at the device that is associated with the group is added to a list of identifiers of devices and/or data sets that belong to the group. When a request for updates to other data sets within that group is executed, a request for an update to the data set for the device will also be request. That is, a request for an update to the data set for the device will be requested when a scheduled request for updates to other data sets that belong to that group is executed. Process 700 can then terminate. Alternatively, for example, process 700 can return to block 710 to handle another new device (i.e., to perform process 700 for the next new device).

Process 700 can include blocks in addition to those illustrated in FIG. 7. Additionally, one or more blocks can be rearranged. For example, blocks 720, 730, 740, and 750 can be repeated to identify multiple data refresh policies which apply to a device (or data set of a device) and schedule data requests for updates to data sets based on those data refresh policies. As another example, data refresh policies can include priority values that define a relative or absolute prioritization of data refresh policies. The data requests for a device can be scheduled after blocks 720, 730, 740, and 750 (that is, blocks 721, 731, 741, and/or 751 are executed after block 750) and a data request related to a device detected at block 710 is scheduled for (or using) the data request policy (or data request policies) that has the highest (or most significant) priority value. Additionally, the data requests for a device can be scheduled after blocks 720, 730, 740, and 750 and the management entity can adjust and/or optimize the times at which request for updated data sets are requested. That is, the management entity can determine, for example, that a first data request is scheduled based on a data refresh policy related to a capability of a device and a second data request is scheduled based on a data refresh policy related to a group including that device, and that a single data request satisfying each of these data refresh policies can be scheduled to request updated data sets from that device. The management entity can remove the first data request and second data request and replace these data requests with a single data request that is scheduled at a time that satisfies both data refresh policies.

Moreover, in some embodiments, process 700 terminates after a matching data refresh policy is identified at block 720, 730, 740, or 750. For example, process 700 can terminate after block 730 is a policy exists for a capability of the device without executing blocks 740 and 750. Furthermore, although process 700 is discussed above with reference to an example environment within a communications network, process 700 is applicable within other environments.

Figure 8:
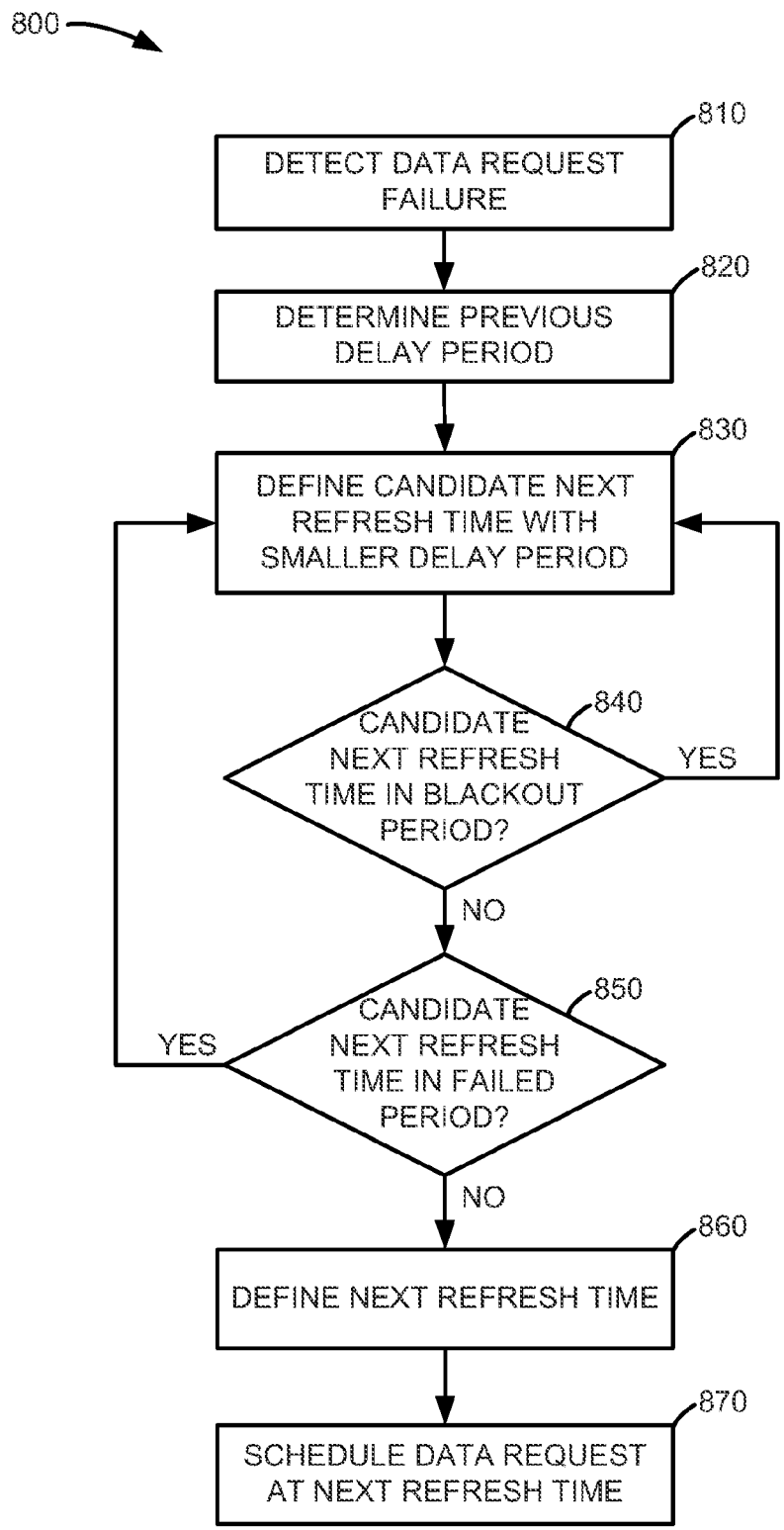
FIG. 8 is a flowchart of a process to schedule a data request in response to a data request failure, according to another embodiment.

FIG. 8 is a flowchart of a process to schedule a data request in response to a data request failure, according to another embodiment. Process 800 can be implemented as a hardware module, as a software module hosted at a computing device, and/or as a combination of a hardware module and a software module. For example, process 800 can be implemented as application-specific circuitry or as a software module including instructions stored at a memory and executed at a processor in communication with the memory. More specifically, for example, process 800 can be implemented at a data coherency engine within a communications network.

A failed request for an updated data set (or update of a data set) is detected at block 810. For example, when an updated data set is requested a timer can be started. If the updated data set is not received before the expiry of the timer, a data coherency engine can determine that request for the updated data set failed. Alternatively, for example, a closed communications session with a device or a communications error that is detected before the updated data set is received can be interpreted at a data coherency engine as a failed data request.

A previous refresh time of the data set is determined at block 820. For example, a data coherency engine can store a time value at a table indexed by an identifier of a data set when the data set is updated (i.e., an updated data set is received). This time value can be used as a previous refresh time at block 820. Alternatively, time values representing previous refresh times can be stored external to a data coherency engine at, for example, a database. An identifier of the data set can be a key to the database such that when the data coherency module provides the identifier of the data set to the database, the database returns the previous refresh time, if any, from the database.

A candidate next refresh time is defined (or generated) at block 830. Typically, a delay period between the candidate next refresh time and the time of the failed request for the updated data set is less than a delay period between a request for the update data set that was executed before the failed request and the failed request. In other words, the period of time (i.e., delay period) between a failed scheduled request and the next scheduled request is less than the period of time between the request scheduled before the failed scheduled request and the failed scheduled request. Said differently, retries of requests for an updated data set increase in frequency. Alternatively, retries of requests for an updated data set can decrease in frequency.

Additionally, data refresh policies that are applicable to the data set for which the previous request failed can be accessed to determine age criteria of the data set. As discussed above, for example, in relation to FIG. 6, the candidate next refresh time can be generated at block 830 to satisfy the age criteria of the data set. In other words, the candidate next refresh time can be at a time before a deadline time defined by a previous refresh time of the data set and the age criteria. If an update to the data set can not be requested before the deadline time (e.g., the deadline time has already passed or an amount of latency within a communications network or data coherency engine prevents requesting and/or receiving an updated data set before the deadline time), a notification of the data set becoming stale or losing coherency can be sent to a user such as a system administrator.

The candidate next refresh time is then compared with blackout periods at block 840 and/or periods during which previous requests for updates to data sets or the particular data set for which the data request failure was detected at block 810 failed at block 850. For example, if the candidate next refresh time is included within a blackout period defined in a data refresh policy which applies to the data set or if the candidate next refresh time is included within a failed period (e.g., a period that is centered around the time at which a previous request for an update to a data set failed) stored at, for example, a data coherency engine, process 800 can return to block 830 and a new candidate next refresh time is defined.

If the candidate next refresh time is not within a blackout period or a failed period, process 800 continues to block 860 and the candidate next refresh time is defined as the next refresh time. A data request (e.g., a request for an updated data set) at the next refresh time is scheduled at block 870. In other words, the data request is scheduled such that it occurs (or is executed) at the next refresh time.

Process 800 can include blocks in addition to those illustrated in FIG. 8. Additionally, one or more blocks can be rearranged. For example, process 800 can include a block to select or access one or more data refresh policies that apply to the data set for which the previous request failed based on, for example, an identifier of that data set. Moreover, process 800 can include a block to send a notification to a user such as a system administrator to report that a request for an updated data set failed. Furthermore, although process 800 is discussed above with reference to an example environment within a communications network, process 800 is applicable within other environments.

Some embodiments include a processor and a related processor-readable medium having instructions or computer code thereon for performing various processor-implemented operations. Such a processor can be a general-purpose processor or an application-specific process and can be implemented as a hardware module and/or a software module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some embodiments, a processor can include multiple processors. For example, a processor can be a microprocessor including multiple processing engines (e.g., computation, algorithmic or thread cores). As another example, a processor can be a computing device including multiple processors with a shared clock, memory bus, input/output bus, and/or other shared resources. Furthermore, a processor can be a distributed processor. For example, a processor can include multiple computing devices, each including a processor, in communication one with another via a communications link such as a computer network.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an embodiment may be implemented using Java™, C++, or other object-oriented programming language and development tools. Additional examples of computer code include, but are not limited to, control signals, encrypted code, and compressed code.

Figure 9:
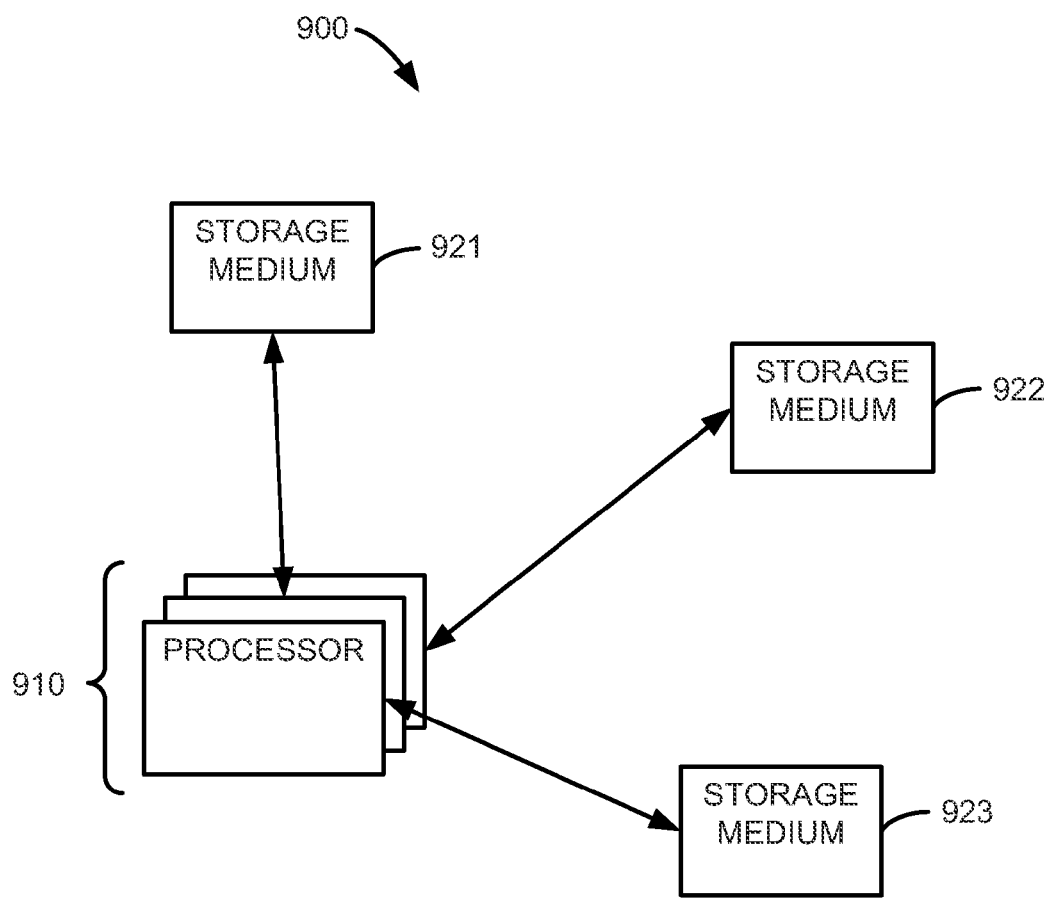
FIG. 9 is a schematic block diagram of a system including a processor and storage media, according to an embodiment.

As an example of a system including one or more processors and processor-readable storage media, FIG. 9 is a schematic block diagram of system 900 including a processor and storage media, according to an embodiment. As illustrated in FIG. 9, system 900 includes one or more processors 910 operatively coupled to storage medium 921, storage medium 922, and storage medium 923. One or more processors 910 can access instructions or code at storage medium 921, storage medium 922, and storage medium 923. Storage media 921, 922, and 923 can be any processor-readable media and/or related devices to access processor-readable media. For example, storage medium 921 can be a hard disk drive including a magnetic storage medium, storage medium 922 can be an optical drive such as a DVD drive and can accept DVD storage media on which processor-readable instructions can be stored, and storage medium 923 can be a FLASH memory drive with a Universal Serial Bus ("USB") interface. In some embodiments, storage media 921, 922, and/or 923 can be local to (e.g., coupled to a common computing device) one or more processors 910. In some embodiments, storage media 921, 922, and/or 923 can be remote from (e.g., coupled to a separate computing device) one or more processors 910 and in communication with one or more processors 910 via communications link. Furthermore, one or more of storage media 921, 922, and/or 923 can be local to one or more processors 910 and one or more of the remaining of storage media 921, 922, and/or 923 can be remote from one or more processors 910.

As a more specific example, one or more processors 910 can be included within a computing device having a hard disk drive represented by storage medium 921 and a DVD drive including DVD media represented by storage medium 922. The computing device can also include a USB host controller to communicate with a FLASH memory drive represented by storage medium 923. One or more processors 910 can access processor-readable instructions such as processor-readable instructions that implement an operating system, software application, and/or one or more processes at any of storage media 921, 922, and/or 923. Said differently, one or more processors 910 can interpret or execute instructions at processor-readable media via storage medium 921, storage medium 922, and/or storage medium 923. In some embodiments, system 900 can include one or more memories such as RAM that function as a cache between one or more of storage medium 921, storage medium 922, and/or storage medium 923 and one or more processors 910 for instructions or code stored (or accessible) at one or more of storage medium 921, storage medium 922, and/or storage medium 923.

While certain embodiments have been shown and described above, various changes in form and details may be made. For example, some features of embodiments that have been described in relation to one embodiment and/or process can be useful to other embodiments. In other words, processes, features, and/or properties of various embodiments (e.g., a process performed or a feature existing at) described in relation to one embodiment can be related to other embodiments. Furthermore, it should be understood that the systems and methods described herein can include various combinations and/or sub-combinations of the components and/or features of the different embodiments described. Thus, features described with reference to one or more embodiments can be combined with other embodiments described herein.

What is claimed is:

1. A non-transitory processor-readable medium storing code representing instructions to cause a processor of a network management entity to perform a process, wherein the network management entity stores data from a number of electronic network devices that are on a network managed by the network management entity, said data specifying a number of attributes of each network device, the process comprising:
   accessing an age criterion associated with a data set corresponding to a particular network device on the network managed by the network management entity;
   determining a previous refresh time associated with the data set;
   defining a next refresh time that satisfies the age criterion and is determined relative to the previous refresh time; and
   scheduling a request to the corresponding network device from the network management entity for data to update the data set for that corresponding network device, the request being scheduled at the next refresh time.

2. The non-transitory processor-readable medium of claim 1, the process further comprising:
   determining a refresh deadline time based on the age criterion and the previous refresh time, the next refresh time being before the refresh deadline time.

3. The non-transitory processor-readable medium of claim 1, wherein the age criterion is a maximum age criterion included within a data refresh policy associated with a corresponding network device comprising a computing device, the process further comprising:
   accessing a minimum age criterion associated with the data set and included within the data refresh policy, the next refresh time satisfies the maximum age criterion relative to the previous refresh time and the minimum age criterion relative to the previous refresh time.

4. The non-transitory processor-readable medium of claim 1, wherein the next refresh time is a first next refresh time and the request for the data set is a first request for the data set, the process further comprising:
   executing the first request for the data set at the first next refresh time;
   determining that the data set was not received in response to the first request for the data set;
   defining a second next refresh time; and
   scheduling a second request for the data set at the second next refresh time.

5. The non-transitory processor-readable medium of claim 1, wherein the next refresh time is a first next refresh time and the request for the data set is a first request for the data set, the process further comprising:
   executing the first request for the data set at the first next refresh time;
   determining that the data set was not received in response to the first request for the data set;
   defining a second next refresh time that satisfies the age criterion relative to the previous refresh time; and
   scheduling a second request for the data set at the second next refresh time.

6. The non-transitory processor-readable medium of claim 1, wherein the next refresh time is a first next refresh time and the request for the data set is a first request for the data set, the process further comprising:
   requesting the data set at the first next refresh time;
   determining that the data set was not received in response to the request for the data set;
   defining a second next refresh time that satisfies the age criterion relative to the previous refresh time; and
   scheduling a request for the data set at the second next refresh time, a first period defined by the previous request time and the first next refresh time different from a second period defined by the first next refresh time and the second next refresh time.

7. The non-transitory processor-readable medium of claim 1, the process further comprising:
   determining, before the defining the next refresh time, that a candidate next refresh time before the next refresh time is within a blackout period; and
   discarding the candidate next refresh time.

8. The non-transitory processor-readable medium of claim 1, the process further comprising:
   determining, before the defining the next refresh time, that a candidate next refresh time before the next refresh time is at a time period associated with a failed request for the data set; and
   discard the candidate next refresh time.

9. A data coherency system, comprising:
   a computing device to store data from a number of network devices that are on a network managed using the data coherency system, said data specifying a number of attributes of each network device;
   a data coherency engine comprising a request schedule module configured to:
      access, in response to information associated with addition of an electronic device to the network, a data refresh policy from a plurality of data refresh policies based on an attribute of the device,
      schedule, at a first time, a first request for a data set associated with the device at a first next refresh time based on an age criterion of the accessed data refresh policy,
      determine, after the first next request time, that the data set was not received in response to the first request for the data set,
      schedule, at a second time, a second request for the data set at a second next refresh time,
   wherein a first period defined by the first time and the first next refresh time is different from a second period defined by the second time and the second next refresh time.

10. The system of claim 9, wherein the first period is greater than the second period.

11. The system of claim 9, wherein the first period is at least two times greater than the second period.

12. The system of claim 9, wherein:
the request schedule module is configured to determine, after the second next refresh time, that the data set was not received in response to the second request for the data set;
the request schedule module is configured to schedule, at a third time, a third request for the data set at a third next refresh time,
a third period defined by the third time and the third next refresh time being different from the first period and from the second period.

13. The system of claim 9, wherein the attribute is associated with a component of the device.

14. The system of claim 9, wherein the attribute is associated with a capability of the device.

15. The system of claim 9, wherein the device discovery module is configured to communicate with the device via a communications link of the communications network.

16. The system of claim 9, wherein the request schedule module is configured to determine, before first time, that the first next request time is not included within a blackout period.

17. A method to maintain data coherency, comprising:
accessing a data refresh policy from a plurality of data refresh policies based on a data set identifier associated with the data refresh policy, each data refresh policy from the plurality of data refresh policies including an age criterion;
defining a first next refresh time for a first request for a data set associated with the data set identifier based on the age criterion of the data refresh policy such that the first next refresh time satisfies the age criterion and is not included within a blackout period;
determining that the data set was not received at the first next refresh time; and
defining a second next refresh time for a second request for the data set based on the age criterion of the data refresh policy such that the second next refresh time satisfies the age criterion of the data refresh policy.

18. The method of claim 17, further comprising:
determining that the first next refresh time is not included within any blackout period from a plurality of blackout periods described within the data refresh policy, the blackout period included within the plurality of blackout periods.

19. The method of claim 17, further comprising:
determining that the first next refresh time is not included within any blackout period from a plurality of blackout periods, the blackout period included within the plurality of blackout periods; and
determining that the second next refresh time is not included within any blackout period from the plurality of blackout periods.

20. The method of claim 17, further comprising:
receiving a notification associated with a new device within a communications network, the accessing being in response to the receiving.

* * * * *